(12) United States Patent
Yang (10) Patent No.: US 7,036,867 B1
(45) Date of Patent: May 2, 2006

(54) CAR COVER

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 11/181,744

(22) Filed: Jul. 15, 2005

(51) Int. Cl.
*B60J 11/00* (2006.01)

(52) U.S. Cl. .......................... 296/136.07; 296/136.01; 296/136.11; 150/166; 280/770

(58) Field of Classification Search .......... 296/136.01, 296/136.07, 136.1, 136.11; 135/88.01; 150/166; 280/770
See application file for complete search history.

(56) References Cited

U.S. PATENT DOCUMENTS

| | | | | |
|---|---|---|---|---|
| 2,733,747 A | * | 2/1956 | Altschul | 150/166 |
| 4,635,996 A | * | 1/1987 | Hirose | 296/136.07 |
| 5,167,267 A | * | 12/1992 | McQuaid | 150/166 |
| 5,244,246 A | * | 9/1993 | Cunningham | 296/136.11 |
| 5,984,401 A | * | 11/1999 | Hannah | 296/136.01 |
| 6,491,335 B1 | * | 12/2002 | Cohill | 296/136.07 |
| 6,517,141 B1 | * | 2/2003 | Su | 296/136.1 |

* cited by examiner

*Primary Examiner*—Lori L. Coletta
(74) *Attorney, Agent, or Firm*—Troxell Law Office, PLLC (57) ABSTRACT

A car cover, include a top piece and at least two-section side pieces. The two-section side pieces can be fabricated from side pieces and inclined pieces, edges of which are designed with non-straight convex arc line cut edges, and horizontally protruding regions are formed after joining the edges. The two-section side pieces can also be fabricated from front side pieces and rear side pieces, edges of which are designed with non-straight convex arc line cut edges, and vertically protruding regions are formed after joining the edges. Space within the outward expanding, curved protruding regions is used to contain rear-view mirrors of the car body when covering the car body with the car cover, thereby achieving a structure that is easy to manufacture and reduces manufacturing cost. Moreover, the car cover has universal suitability for many different car models and provides the convenience of covering and uncovering.

3 Claims, 9 Drawing Sheets

CAR COVER

BACKGROUND OF THE INVENTION (a) Field of the Invention

The present invention relates to car covers, and more particularly to an improved structural design for a car cover that provides protruding spaces at positions corresponding to locations of side rear-view mirrors of a car. Moreover, the car cover is easy to manufacture, enhances production performance and reduces manufacturing cost. Furthermore, the car cover has extensive use in being able to cover the car body of many different car models, and achieves effectiveness of the car cover not being propped up by the rear-view mirrors of the car, thereby enabling the car cover to completely cover the car body.

(b) Description of the Prior Art

A conventional car cover is formed from a single piece of covering material or by stitching together a top piece and two side pieces to form a single body of covering material. Although such a conventional car cover is able to cover a car body and prevent damage to the car from sunlight and rain water, however, two sides of the car cover bulge outwards when covering the car body because of the two outwardly protruding rear-view mirrors respectively disposed on the two sides of the car, which pulls the bottom edges of the car cover upwards. Hence, the car cover is unable to completely cover and conceal the car body, which may result in a strong wind blowing the car cover off from the car body.

Figure 9:
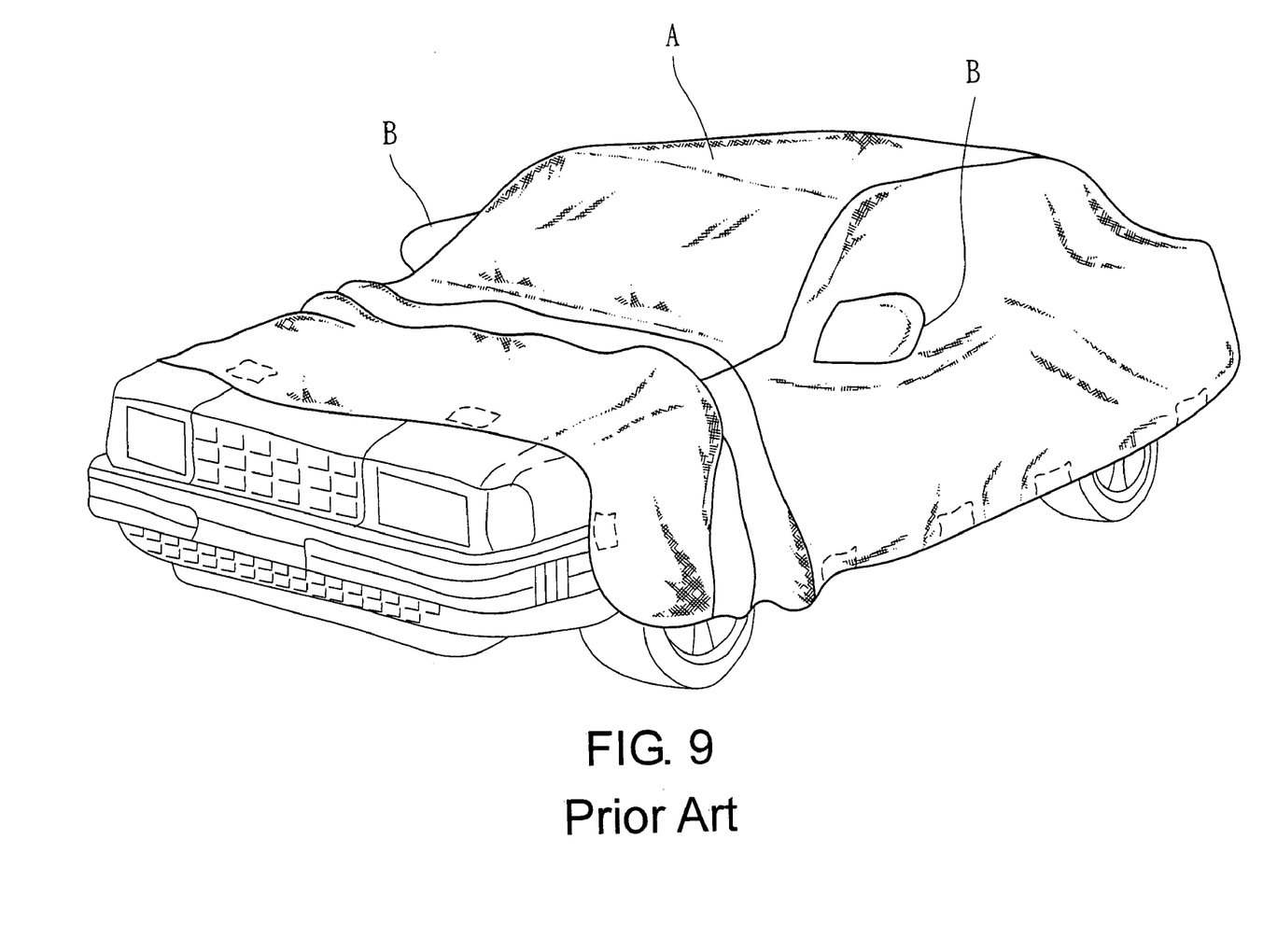
FIG. 9 shows an exterior schematic view of a car cover of prior art.

Referring to FIG. 9, which illustrates another familiar car cover A, which includes pouches B disposed at positions of the two side rear-view mirrors. In order to fabricate each of the pouches B, a plurality of strips must be first cut and stitched together to form a pocket. Moreover, a hole must be cut in each side piece C, and then an open edge of each of the prepared pockets is further stitched to the edge of the respective hole of the side pieces C. The entire manual manufacturing process is relatively troublesome and involves multiple working procedures, including the relatively difficult procedure of circular or square stitching to join together the plurality of cut strips to form the pockets, which results in a reduction in production efficiency. Furthermore, ineffective watertightness of the stitched edges causes further apprehension over water leaking through the car cover. Thus, increased total manufacturing cost and reduced production efficiency are the major shortcomings in the production of this type of conventional car cover. Notwithstanding, using the pouches B to contain the rear-view mirrors is an improvement on the aforementioned drawbacks of a single sheet car cover. However, because position of the rear-view mirrors varies in different car models or different makes of cars, thus, the car cover cannot be produced in one type, which reduces practicability of the car cover. Furthermore, a car body cannot be quickly covered or uncovered with the car cover because the rear-view mirrors must be contained within the pouches B, which reduces the convenience of using the car cover.

In light of the aforementioned shortcomings in practicability and the inconvenience of use, the inventor of the present invention has actively researched and carried out a multitude of tests before ultimately developing an improved structure for a car cover that can be used to cover different car models, and enables the general consumer to simply and conveniently cover and uncover a car with the car cover.

SUMMARY OF THE INVENTION

Hence, a primary objective of the present invention is to provide an improved structure for a car cover that comprises a single car cover having extensive use in being able to cover the car body of many different car models, Moreover, a single user can easily accomplish covering and uncovering the car cover.

Another objective of the present invention is to provide the improved structure for a car cover that is fabricated from fewer cut pieces. Moreover, the cut pieces do not require stitching in advance in order to form pouches for containing rear-view mirrors of a car, thereby enhancing production efficiency and furnishing the stitched car cover with a three-dimensional visual effect.

In order to achieve the aforementioned objectives, the car cover of the present invention is fabricated to comprise a top piece and at least two-section side pieces. The top piece is disposed at a top end of the car cover, and left and right sides of the top piece join to the two-section side pieces. The two-section side pieces can be joined to inclined pieces by stitching horizontally. The two-section side pieces can be also joined to front pieces and rear pieces by stitching vertically. Adjoining edges of the two side pieces are non-straight cut edges, and assume convex arc lines. Hence, horizontally or vertically protruding regions are formed after joining the side pieces. When covering a car body with he car cover, space within the outward expanding, curved protruding regions is used to contain rear-view mirrors disposed on the car body, thereby achieving universal suitability for many different car models and provides the convenience of covering and uncovering.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
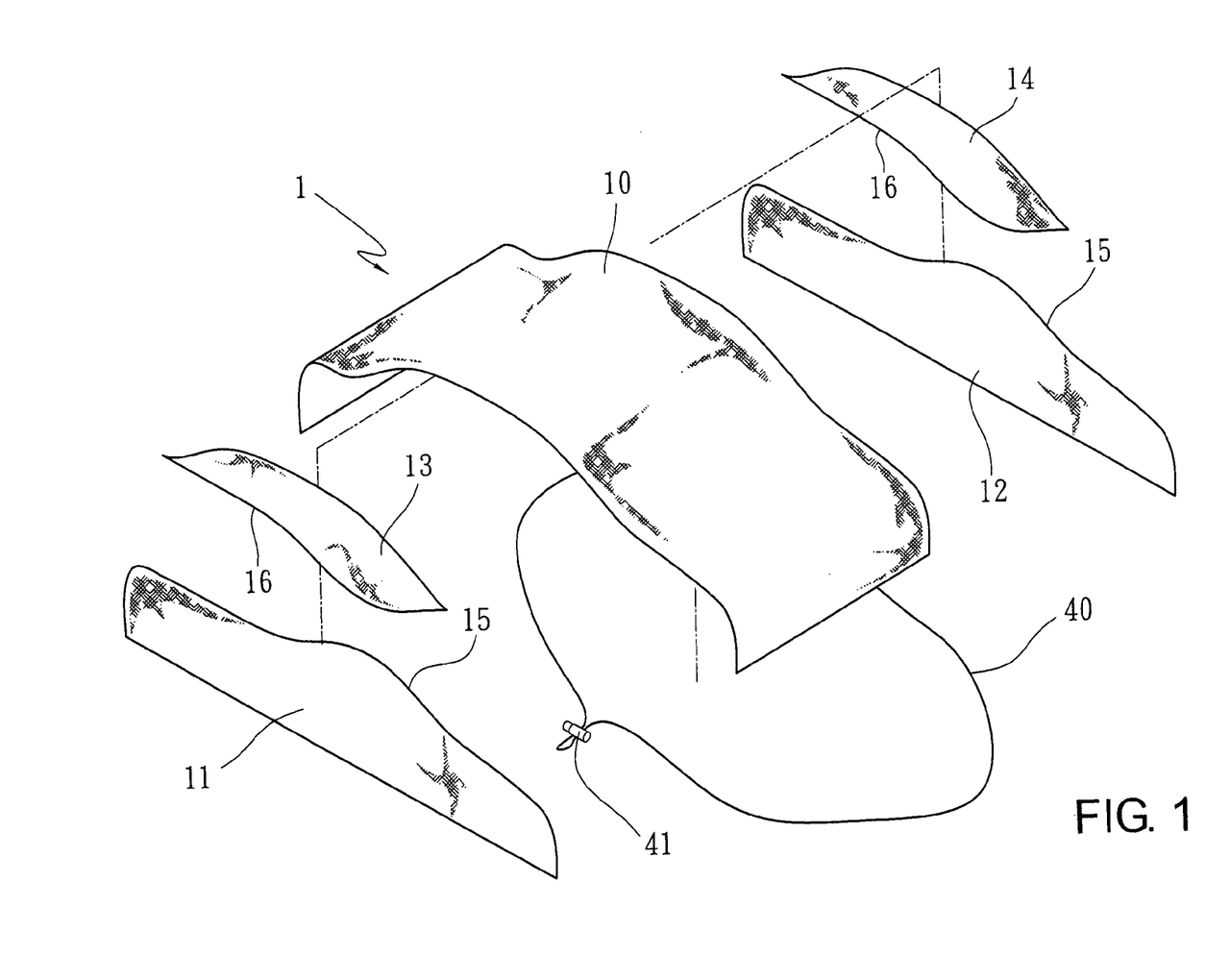
FIG. 1 shows an exploded schematic view of a structure according to the present invention.
Figure 3:
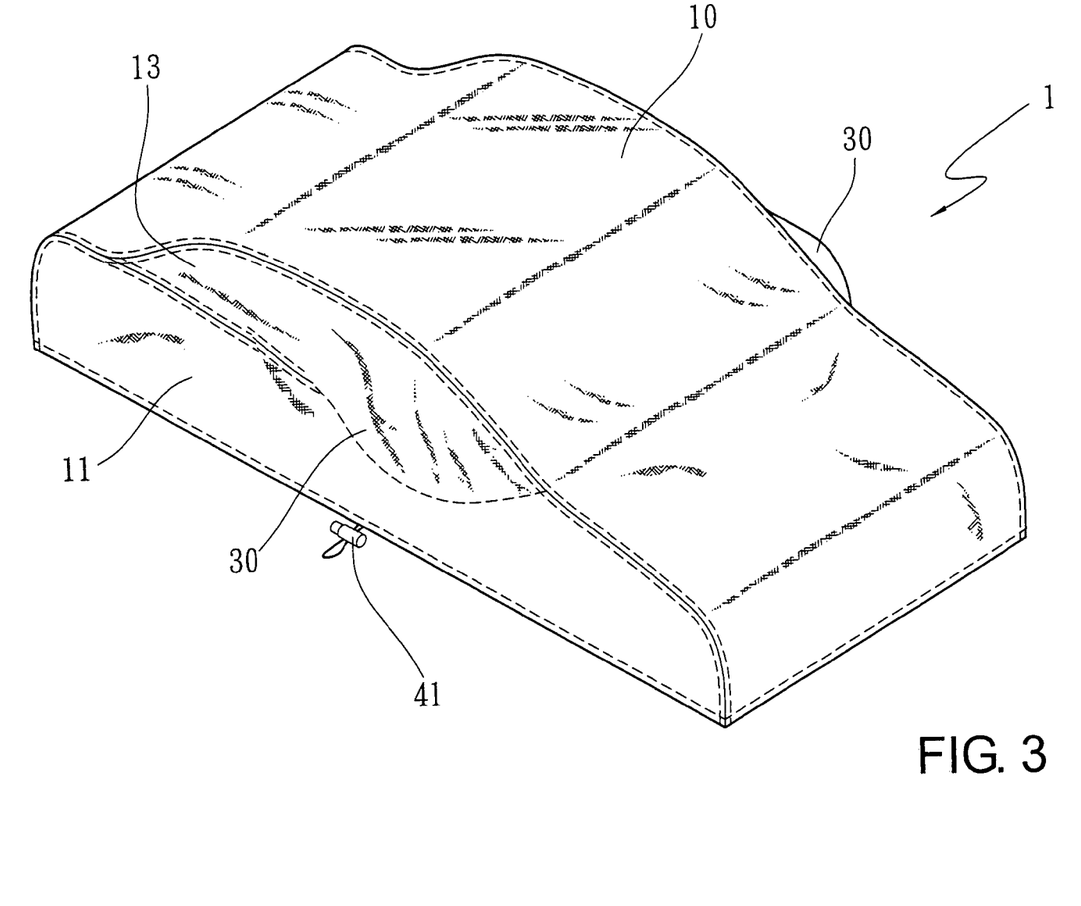
FIG. 3 shows an elevational schematic view of the first embodiment according to the present invention.

Referring to FIGS. 1, and 3, which show an embodiment of an improved structure for a car cover of the present invention, wherein a car cover 1 is structured to comprise a plurality of cut pieces, including at least one top piece 10, two symmetrically shaped side pieces, including a left side piece 11 and a right side piece 12, two inclined pieces 13, 14 and a pull cord 40. The top piece 10, the left and right side pieces 11, 12 and the inclined pieces 13, 14 are respectively stitched together by means of their respective edges to form the three-dimensional shaped car cover 1.

Figure 2:
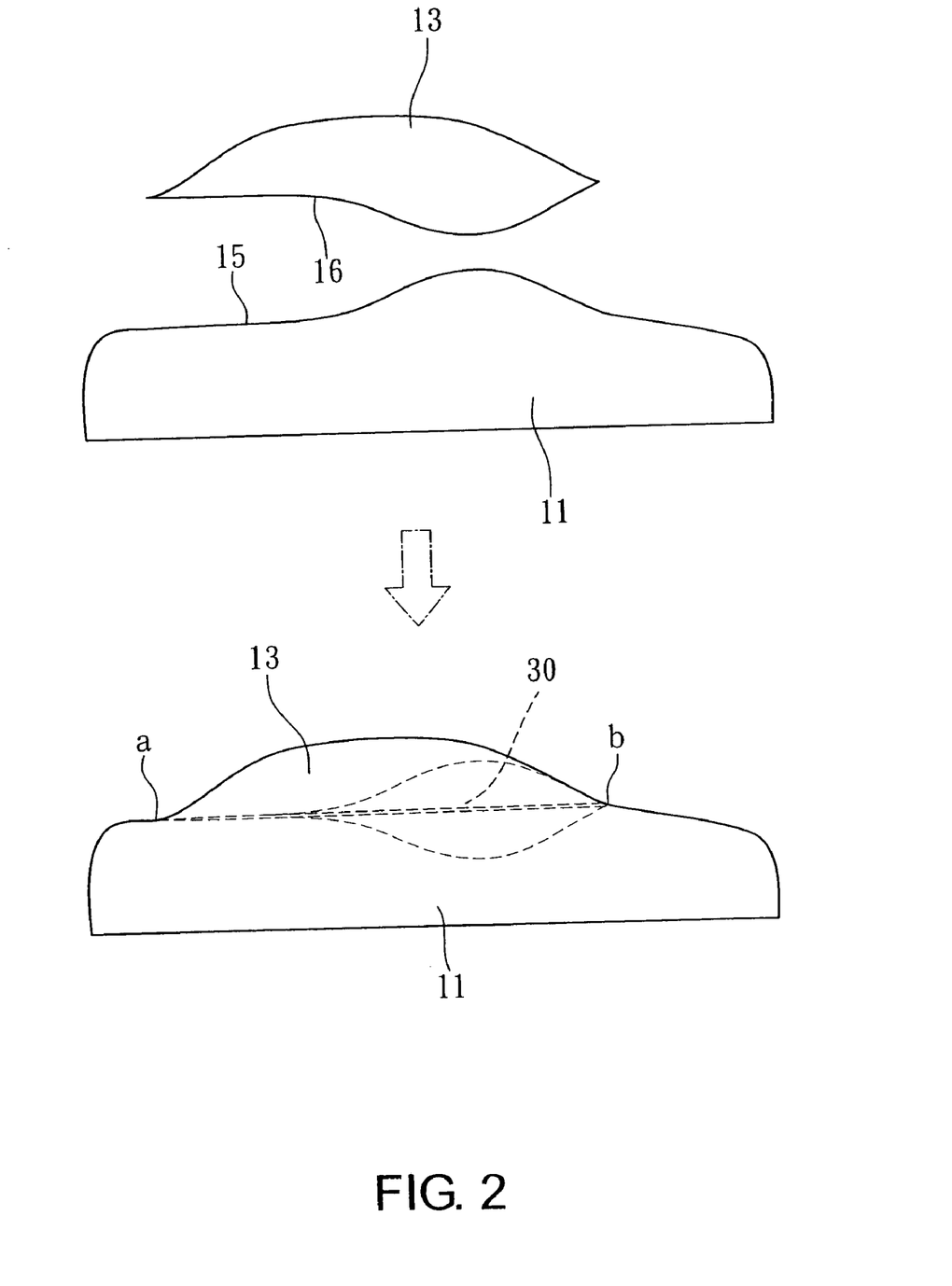
FIG. 2 shows a schematic view of assembling and assembly of cut pieces of a first embodiment according to the present invention.
Figure 4:
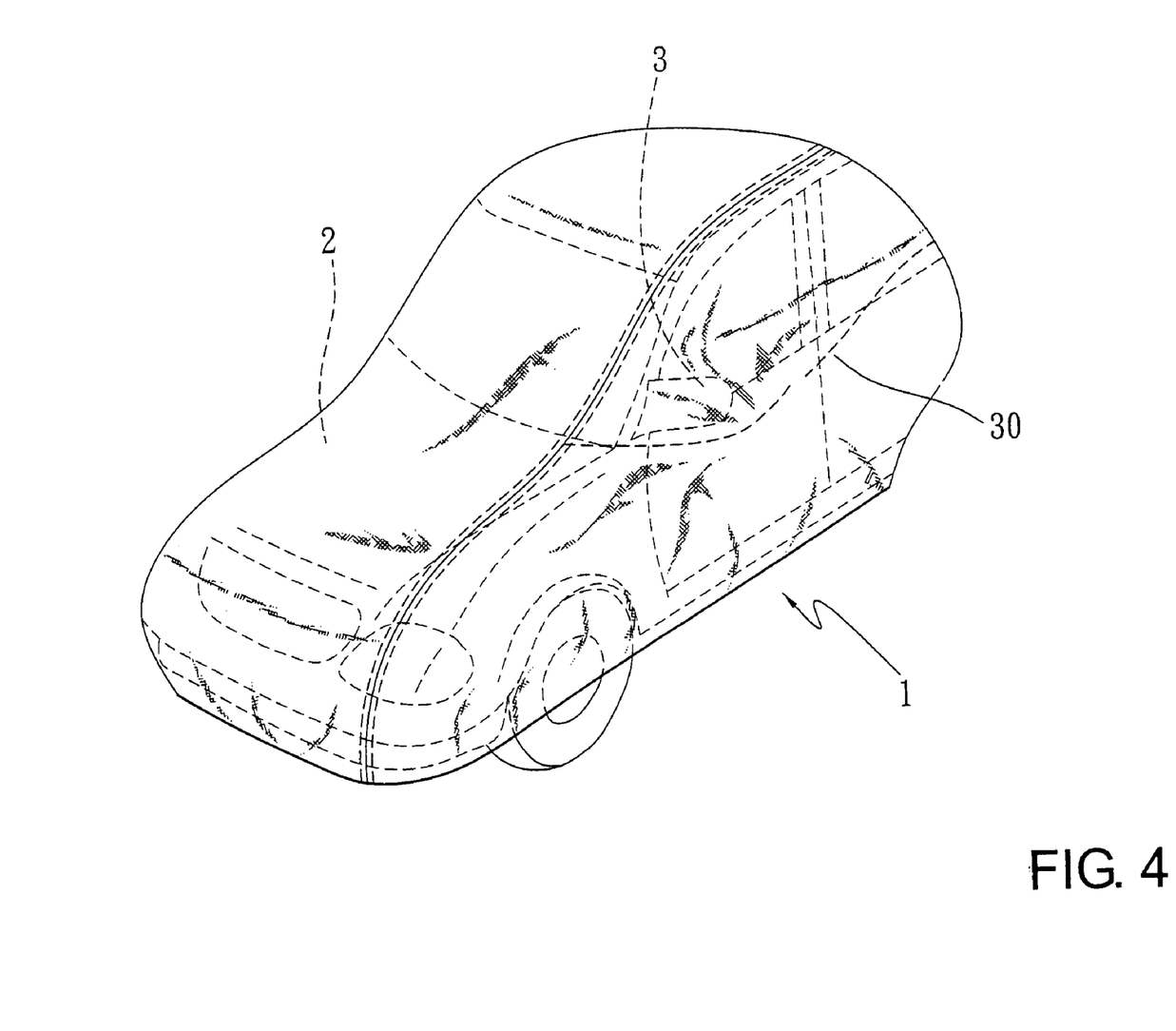
FIG. 4 shows a partial elevational schematic view of the first embodiment according to the present invention.

Referring to FIGS. 2 and 3, the two left and right portions of the aforementioned car cover 1 are of symmetric design, hence, the following description uses an embodiment of one side portion to describe the design characteristics that are equally embodied in both the left and right side portions according to the present invention. FIGS. 2 and 3 illustrate the left side piece 11 designed with a non-straight cut edge, which assumes a specific convex arc line 15. The inclined piece 13 is designed with a specific convex arc line 16 at an edge that adjoins the left side piece 11. The left side piece 11 is stitched to the inclined piece 13 commencing at a point location a as depicted in FIG. 2. After the stitching reaches a point location b, the left side piece 11 and the inclined piece 13 are thus stitched together and a horizontally protruding region 30 is formed, represented by a dotted line in FIG. 2. The protruding region 30 is not of the pouch-form structure of prior art car covers, but forms a region central of which has a prominent elevation. Perimetric surface of the elevation is mostly an inclined surface or a slowly progressive curved surface. The protruding region 30 thus provides fro a rear-view mirror 3 to extremely easily slip therein (see FIG. 4); thereby facilitating covering a car body 2 with the car cover 1. Stitching art or hot-pressing can be used to securely join together the two differently shaped cut pieces of the left side piece 11 and the inclined piece 13 to form an integral body therefrom. The protruding regions 30 on each side of the car body 2 each assume an arc-shape having a hollow center that expands outward, which provide for the left and right side rear-view mirrors 3 of the car body 2 to be respectively contained therein (see FIG. 4). The protruding regions 30 are able to contain rear-view mirrors disposed at different positions on different makes of cars. Hence, the car cover 1 has universal suitability for a wide range of cars.

Figure 5:
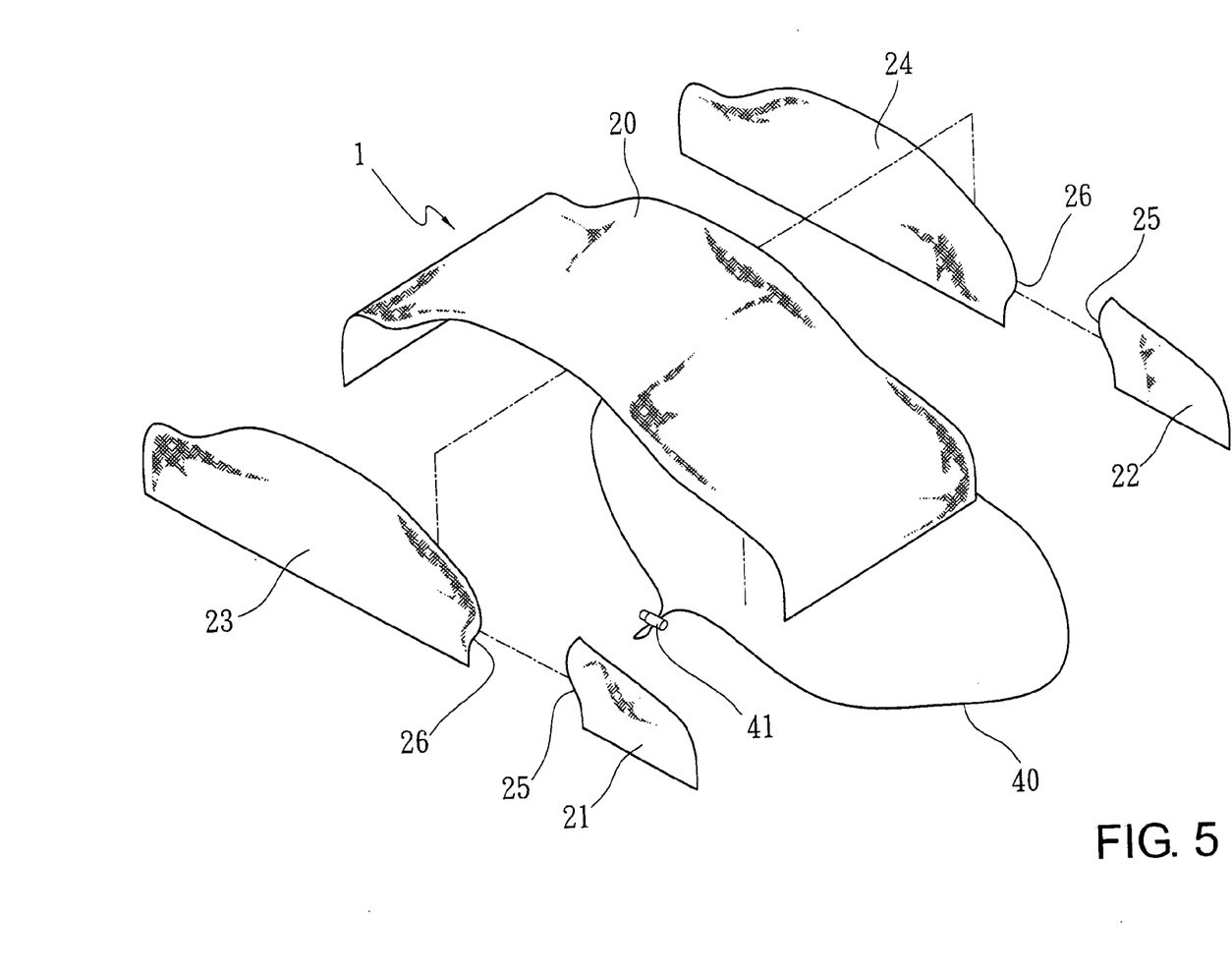
FIG. 5 shows an exploded schematic view of a structure of a second embodiment according to the present invention.
Figure 6:
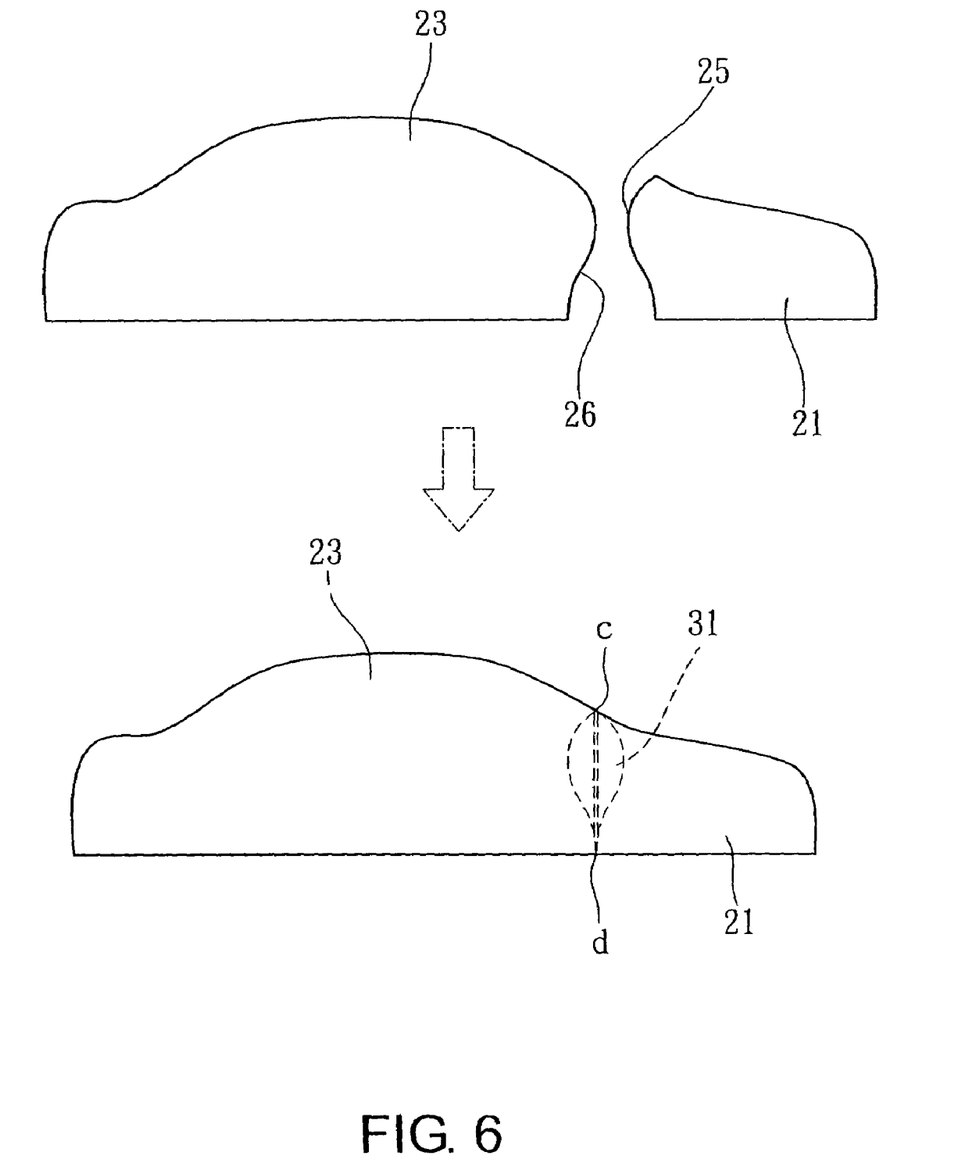
FIG. 6 shows a schematic view of assembling and assembly of cut pieces of the second embodiment according to the present invention.

Referring to FIGS. 5 and 6, which depict another embodiment of the present invention, wherein the car cover 1 is fabricated to comprise a top piece 20, two symmetrically shaped side front pieces, including a left-side front piece 21 and a right-side front piece 22, two symmetrically shaped side rear pieces, including a left-side rear piece 23 and a right-side rear piece 24. The top piece 20, the left and right side front pieces 21, 22 and the left and right side rear pieces 23, 24 are respectively stitched together by means of their respective edges to form the three-dimensional shaped car cover 1.

Each pair of the symmetrically shaped side pieces (21, 22 and 23, 24) of the car cover 1 of the embodiment, as depicted in FIGS. 5 and 6, is symmetrically disposed and joined to the top piece 20, hence, one side portion of the car cover 1 is used as an exemplary example of the two side portions and described hereinafter. A side portion of the car cover 1 is fabricated by stitching together the single cut left-side front piece 21 and the single cut left-side rear piece 23. Referring to FIG. 6, a rear end of the left-side front piece 21 is designed with a specific convex arc line 25, and an end of the left-side rear piece 23 adjoining the rear end of the left-side front piece 21 is designed with a specific convex arc line 26. The left side front piece 21 is stitched to the left-side rear piece 23 commencing at a point location c as depicted in FIG. 6. After the stitching reaches a point location d, the left side front piece 21 and the left side rear piece 23 are thus stitched together and a vertically protruding region 31 is formed, represented by a dotted line in FIG. 6. The protruding region 31 is not of the pouch-form structure of prior art car covers, but forms a region central of which has a prominent elevation. Perimetric surface of the elevation is mostly an inclined surface or a slowly progressive curved surface. The protruding regions 31 thus provide for the left and right side rear-view mirrors 3 to be contained therein and are able to contain rear-view mirrors disposed at different positions on different makes of cars.

Figure 7:
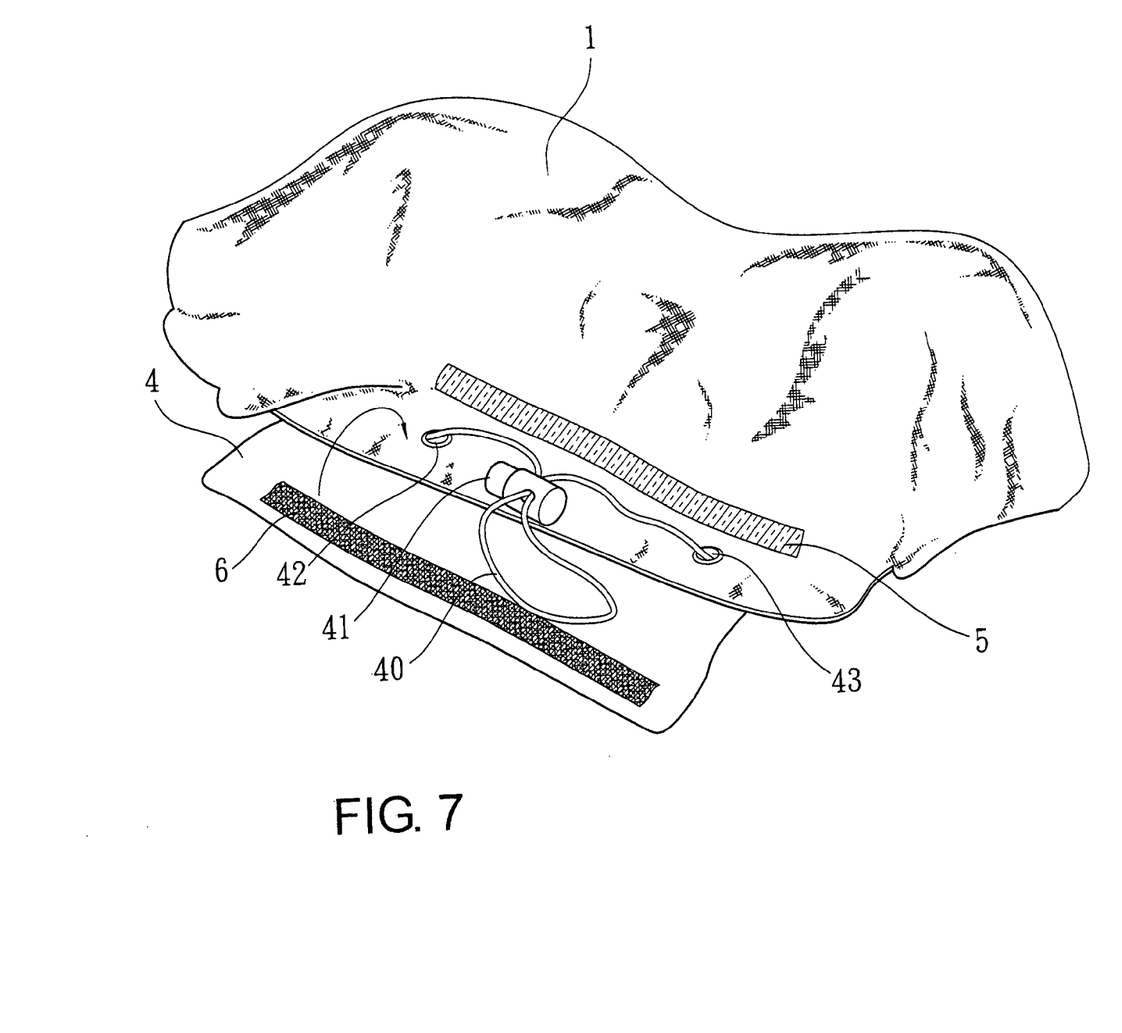
FIG. 7 shows a partial structural schematic view of the second embodiment according to the present invention.
Figure 8:
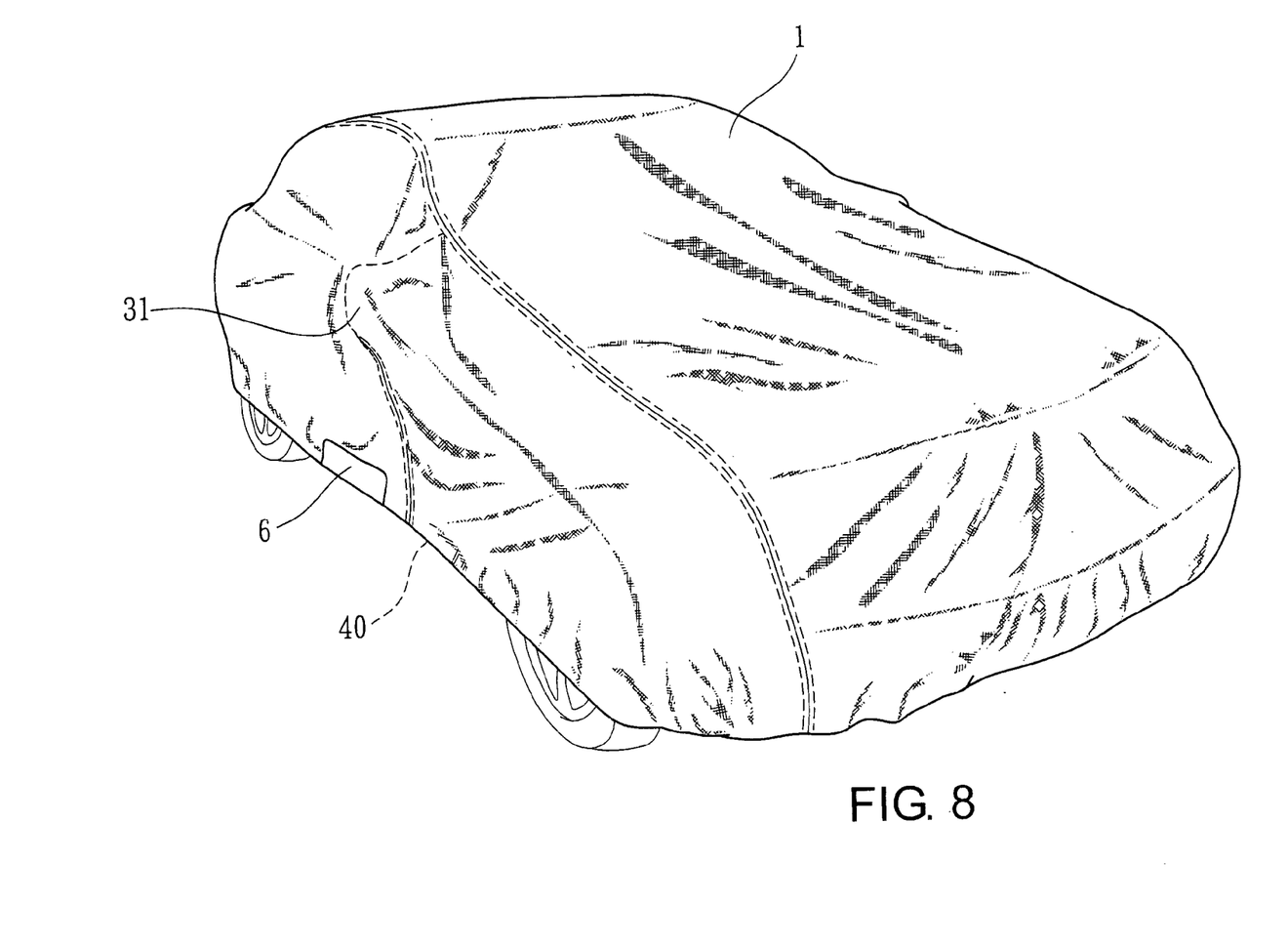
FIG. 8 shows a schematic view of the second embodiment of the present invention in use.

Referring to FIGS. 7 and 8, a skirting of the car cover 1 of the present invention can be designed with an interlining for concealing the pull cord 40 and a cord fastener 41 used for fastening the cord 40. Two ends of the pull cord 40 respectively penetrate specific through holes 42, 43 of the interlining, and after the two ends of the pull cord 40 are fastened with the cord fastener 41, a decorative piece 4 stitched external of the skirting of the car cover 1 covers the pull cord 40 and the cord fastener 41. A male hook and loop fastening strip 5 is attached to a surface of the car cover 1, and a female hook and loop fastening strip 6 is attached to a surface of the decorative piece 4. After the decorative piece 4 is folded over, the two hook and loop fastening strip strips 5, 6 are then able to adhere together and conceal the cord fastener 41 (see FIG. 8).

The two aforementioned different embodiments of the car cover 1 are provided with common features, including both being formed from two horizontally distributed cut pieces or from two vertically distributed cut pieces, and after specific convex arc lines defined on peripheral edges of the cut pieces are joined together to form an integral body, protruding regions (30, 31) are formed, each having slowly progressive inclined surfaces surrounding a protuberant space, which do not assume a pouch-form of prior art, that enables easy covering of the car body 2 with the car cover 1 by a user. Moreover, the user standing on one side of the car can easily accomplish covering and uncovering of the car cover, thereby avoiding the inconvenience of the user having to change places to the two sides of the car body 2 in order to achieve covering and uncovering of the traditional car cover. Furthermore, the protruding regions (30, 31) joined to the car cover 1 furnish a three-dimensional visual effect.

In conclusion, the present invention assuredly achieves anticipated objectives with a car cover that is convenient to use, and of practical value. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A car cover comprising at least one top piece, at least one left side piece and one right side piece and two inclined pieces; comprising:
   the top piece is disposed on a top end of the car cover, and left and right sides of the top piece join to the other pieces;
   the left side piece and the right side piece are designed with non-straight cut edges, which assume specific convex arc lines at edges adjoining side edges of the inclined pieces;
   the inclined pieces are designed with specific convex arc lines at edges adjoining the left side piece and the right side piece;
   whereby the top piece is on the top end, and the left side piece and one inclined piece are joined to a left side of the top piece, the right side piece and one inclined piece are joined to a right side of the top piece, thereby forming a three-dimensional shaped car cover after the top piece, the left side piece, the right side piece and the two inclined pieces are joined together; horizontally protruding regions are formed on the car cover at positions where the left and right side pieces respectively join to the inclined pieces.

2. The car cover according to claim 1, comprising the left side piece and the right side piece are symmetrically disposed according to shape.

3. A car cover comprising at least one top piece, at least one left side front piece and one right side front piece, at least one left side rear piece and one right side rear piece; comprising:

the top piece is disposed on a top end of the car cover, and left and right sides of the top piece join to the other pieces;

the left side front piece and the right side front piece are designed with non-straight cut edges, the left side front piece assumes a specific convex arc line at an edge adjoining a side of the left side rear piece, the right side front piece assumes a specific convex arc line at an edge adjoining a side of the right side rear piece;

the left side rear piece and the right side rear piece are designed with non-straight cut edges, the left side rear piece assumes a specific convex arc line at an edge adjoining a side of the left side front piece, the right side rear piece assumes a specific convex arc line at an edge adjoining a side of the right side front piece;

whereby after the top piece, the left side front piece and the right side front piece, the left side rear piece and the right side rear piece are joined together the car cover is thereby formed, vertically protruding regions are formed on the car cover at positions where the left and right side front pieces and the left and right side rear pieces are respectively joined.

* * * * *